April 24, 1962 D. F. WINTER 3,030,759
CHAIN PULL UNIT STUBBLE CLEANER
Filed July 6, 1959 2 Sheets-Sheet 1

Daniel F. Winter
INVENTOR.

April 24, 1962
D. F. WINTER
3,030,759
CHAIN PULL UNIT STUBBLE CLEANER
Filed July 6, 1959
2 Sheets-Sheet 2
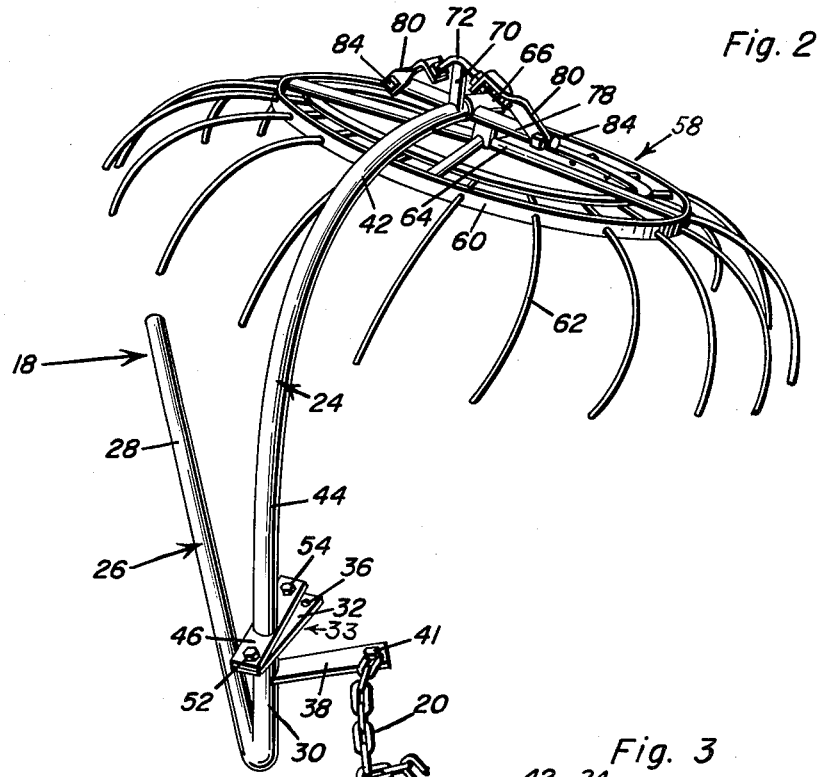
Fig. 2
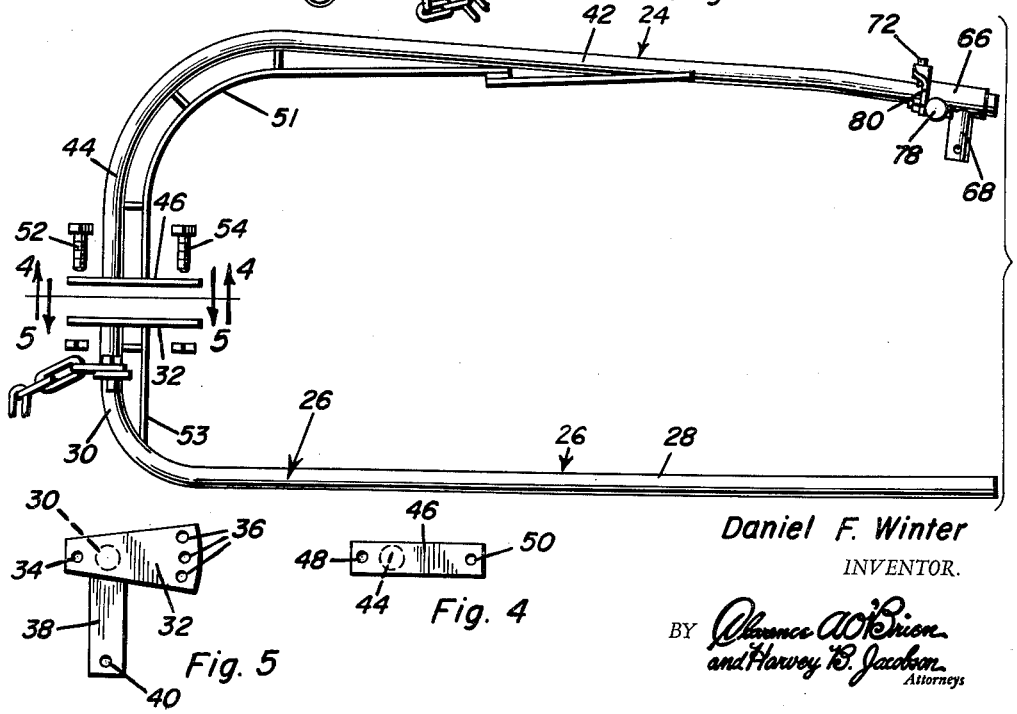
Fig. 3
Fig. 4
Fig. 5
Daniel F. Winter
INVENTOR.
BY *Clarence A.O'Brien*
*and Harvey B. Jacobson*
Attorneys United States Patent Office 3,030,759
Patented Apr. 24, 1962

3,030,759
CHAIN PULL UNIT STUBBLE CLEANER
Daniel F. Winter, P.O. Box 126, Ceylon, Minn.
Filed July 6, 1959, Ser. No. 825,337
9 Claims. (Cl. 56—377)

This invention comprises a novel and useful chain pull unit stubble cleaner and more particularly relates to a rotary rake attachment adapted for connection to a plow for cleaning stubble from the ground in preparation for the next row to be broken by the plow.

Many types of crops, when harvested, leave broken vines, stalks, and stubble upon the ground which are of such size and quantity as to interfere with their ready passage between the beams of multiple plows of a plowing operation. This in turn causes the stalks or stubble to accumulate in the plow beams thereby detrimentally effecting the plowing operation.

It is the primary purpose of this invention to provide a rotary rake for clearing such stubble from the ground over which the plow or plows are to next travel in order to prevent a hampering of the plowing operation by the presence of stubble or stalks upon the ground. A further object of the invention is to provide a stalk and stubble cleaner attachment which may be quickly and easily applied to any conventional type of single or gang plow assembly and which may be readily adjusted to effectively clear the ground in preparation for the next furrow to be plowed.

A further object of the invention is to provide an attachment in accordance with the foregoing object which may be readily connected to a conventional plow, will travel and be guided in the furrow opened by the plow, and can be effectively adjusted to clear the adjacent soil in readiness for plowing the next furrow or set of furrows.

Still another purpose of the invention is to provide an attachment in accordance with the foregoing objects wherein the degree of tilt of the rotary rake wheel can be readily and easily adjusted to thereby control the area raked by the wheel and to regulate its delivery to facilitate depositing the stalks or stubble into the plowed furrow where it will be readily covered by the next plowing operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of the attachment removed from the plow;

FIGURE 3 is an elevational view showing in separated relationships the upper support portion and the lower guide portion of the attachment;

Figure 1:
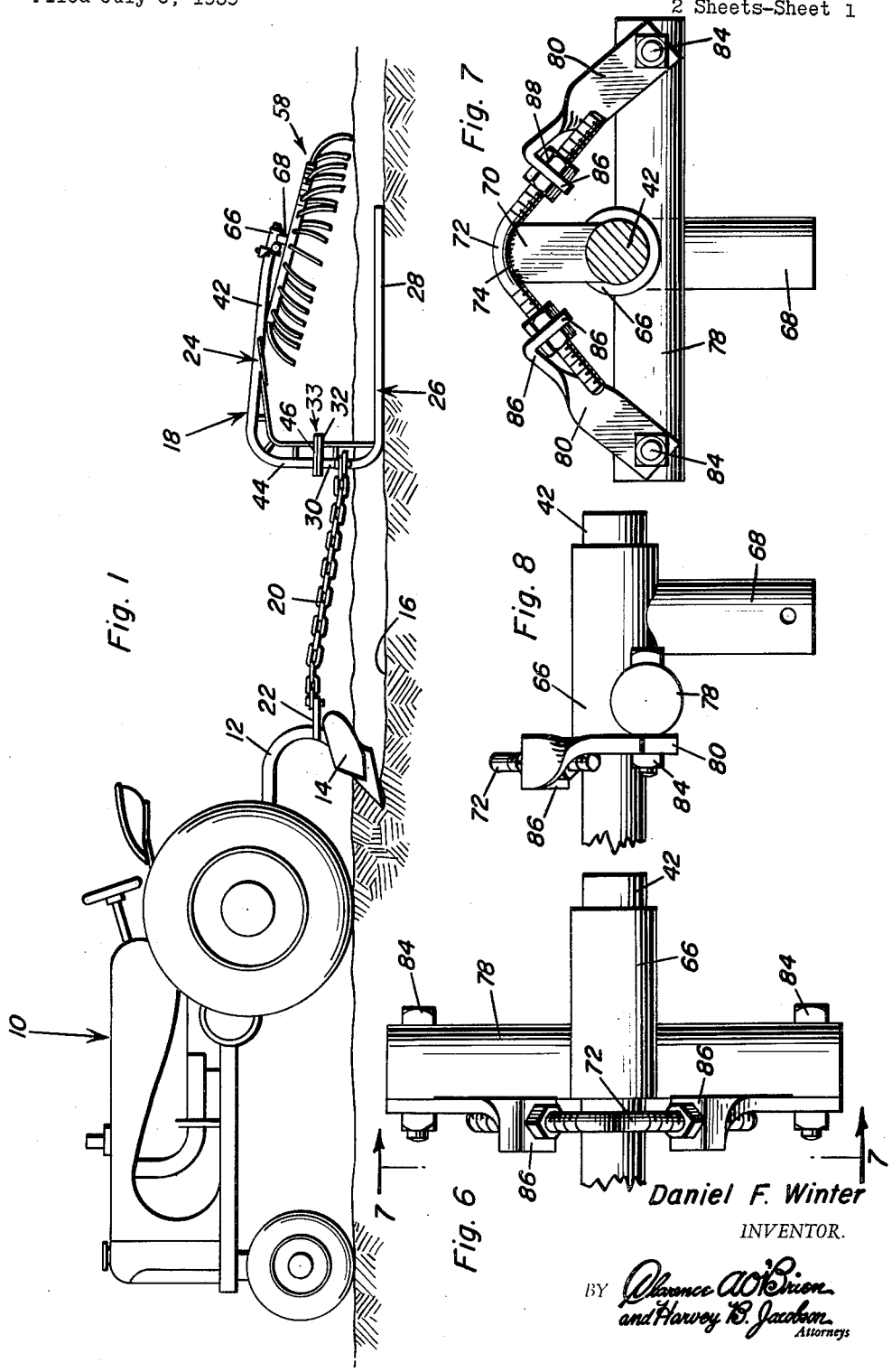
FIGURE 1 is a side elevational view showing a preferred embodiment of the attachment in accordance with this invention and its connection to a conventional tractor drawn plow assembly for use therewith.

FIGURES 4 and 5 are plan views of the cooperating adjustment plates by which the upper and lower portions of the device are adjustably connected to each other, being taken respectively upon the planes indicated by the section lines 4—4 and 5—5 of FIGURE 3;

FIGURE 6 is an enlarged fragmentary top plan view of a portion of the upper part of the attachment and showing the adjusting means by which the rotary rake is adjustably mounted upon the upper support member of the attachment;

FIGURE 7 is a vertical transverse sectional view taken substantially upon a plane indicated by the section line 7—7 of FIGURE 6; and FIGURE 8 is a side elevational view of the arrangement of FIGURE 6.

Referring first to FIGURE 1 it will be observed that the numeral 10 designates a tractor comprising a propulsive means by which the beam 12 of a plow or plow assembly 14 is drawn through the soil to form a furrow 16. The stubble rake attachment of this invention designated generally by the numeral 18 is shown connected as by a chain 20 which constitutes a draft means, to a bracket or drawbar member 22 carried by the beam of the plow or assembly of plows 14.

The arrangement is such that the attachment 18 may be coupled by the chain 20 to any conventional plow or gang plow assembly and when so connected the operation of the plow in opening a furrow will draw the attachment through the furrow therebehind and effect a raking operation to clear the unbroken ground beside the furrow of stubble, stalks or the like and sweep the same into the open furrow 16 formed by the plow or plows in readiness to cover the same during the next plowing operation. The operation of this device will therefore clear a strip of ground adjacent the last opened furrow in readiness for the forming of a next furrow or series of furrows by the plow, thereby greatly contributing to the efficiency of the plowing operation, clearing the field of stubble, and burying the stubble in the plowed furrows to thereby beneficially effect the plowed soil.

Referring now especially to FIGURES 2 and 3 it will be observed that the rake attachment 18 consists of separable and adjustable upper and lower portions comprising an upper section 24 detachably and adjustably secured to a lower section 26. The lower section consists of an elongated substantially straight rod-like member whose straight horizontally extending lower member 28 is adapted to ride and be guided in the furrow 16 as shown in FIGURE 1. At the forward end of the lower member 28, referring to FIGURE 3, there is a perpendicular vertically extending end portion 30, connected to the lower member 28 as by a smoothly curving continuation or joint between the same, which upstanding portion 30 is provided with and has fixed secured thereto a horizontally extending flat plate 32, see also FIGURE 5, comprising the lower component of an adjustable coupling means indicated generally by the numeral 33. This plate extends transversely across the upper end of the neck portion 30 as will be best apparent from a comparison of FIGURES 3 and 5, and at one end is provided with a single aperture 34 while its other end is provided with a series of spaced apertures 36. It will be observed that the apertures 36 are all disposed upon an arc struck about the center of the aperture 34 as a radius for a purpose to be subsequently set forth.

Below the mounting or clamping plate 32 the neck portion 30 is provided with a laterally extending lug 38, apertured as at 40 for reception of the previously mentioned draft means or chain 20, a bolt or other fastener 41 being provided for this purpose.

The upper section 24 of the rake assemly 18 includes an elongated substantially horizontally extending and generally straight member in the form of a rod 42 which at its forward end is provided with a vertical downwardly extending stem or neck portion 44, these elements being connected by a smoothly curving integral continuation thereof. At its lower end the neck portion 44 has fixedly secured thereto a plate 46 which extends transversely to opposite sides of the stem 44 and is complementary to the plate 32 of the guide assembly 26. The plate 46, as shown best in FIGURE 4, has a pair of apertures 48 and 50 in its opposite extremities. The aperture 48 is adapted to receive a fastening bolt 52 by which the upper plate 46 is secured to the lower plate, the bolt 52 passing through the aligned apertures 48 and 34 and serving as a pivot by which the upper and lower sections may be relatively adjusted with respect to each other for their horizontal swinging movement. A similar fastener in the form of a bolt 54 extends through the aperture 50 in the upper plate 46, and is selectively received in one of the apertures 36 of the lower plate with which last mentioned apertures the upper plate aperture 50 is adapted to be registered during swinging movement of the upper plate and upper section about the pivot formed by the bolt 52. In this manner, the rod or arm 52 of the upper section may be swung horizontally with respect to the lower section and thereby position the axis of the upper section at various horizontally spaced relations with respect to the axis of the member 28 of the lower guide section.

As so far described it will now be apparent that the rod-like foot member 28 of the guide section will be disposed in the bottom of the furrow 16 and will be maintained with its axis lying along the axis of the furrow, at all times, while the arm 42 of the upper section can be adjusted horizontally with respect to the axis of the foot member 28 for a purpose to be subsequently apparent.

In order to rigidify and support the rearwardly trailing extremities of the upper and lower sections, suitable reinforcing rods 51 and 53 are welded or otherwise rigidly secured to the upper section portions 42 and 44 and the upper plate 46 and to the lower section 30 and the plate 32, as shown best in FIGURE 3.

Upon the rearward end of the arm 42 of the upper support section 24 there is provided a mounting and supporting means for the rotary rake indicated generally by the numeral 58.

Shown particularly in FIGURE 2 is the construction of the rotary rake wheel. The latter consists of a ring or annular frame 60 which may comprise a channel member in cross-section, and to which are secured a plurality of wire-like rake teeth 62. These teeth curve outwardly from the ring portion 60 and laterally and downwardly therefrom as shown in FIGURE 2. The wheel is provided with the usual spokes, one of which is shown at 64 and which extend from the ring 60 to a central bearing member not shown, and by which the wheel is rotatably supported. The wheel is journalled upon a floating support, which as will be more readily apparent from a consideration of FIGURES 1, 3, 6–8 consists of a T-shaped fitting such as a pipe joint comprising a sleeve 66 rotatably journalled upon the rearward portion of the support arm 42 which sleeve has an integral depending stem 68. The journal bearing or true hub of the wheel is carried by the depending stem 68 upon the exterior or upon the interior of the latter so that although the wheel rotates about the axis of the depending stems 68, the enire wheel is free to rotate with its mounting means by pivoting of the sleeve 66 upon the horizontal axis of the support arm 42.

Adjusting means is provided for imparting any desired tilting or pivoting of the wheel and its sleeve 66 with respect to the horizontal axis of the support arm 42. This adjusting means comprises an integral or rigidly attached upstanding post 70 rising from the top surface of the support arm 42 just forwardly of the sleeve 66 journalled thereon. An L-shaped bolt as at 72 is rigidly secured as by welding 74 at its mid-portion to the upper surface of the post 70 so that the two externally threaded legs 76 of the bolt project at equal angles downwardly and outwardly from opposite sides of the support post 70. Suitably secured to the sleeve 66 forwardly of stem 68 is a transversely extending cross-member 78 which may be in the form of a cylindrical member to which is secured a pair of straps 80 by means of bolts and apertures 84 in the straps. The upper end of the straps are provided with laterally projecting flanges 86 which have apertures for the reception of the screw-threaded extremity 76 of the L-shaped fastening bolt 72. Adjusting nuts as at 88 are threaded upon the threaded leg 76 of the bolt 72 and engage opposite sides of the flanges 86 of the straps 80. Since the L-shaped bolt 72 is stationary, and the straps 80 are secured to the cross members 78 and are adjustably engaged upon the bolt 72, it is obvious that manipulation of the nuts 88 will impart any desired tilting of the wheel with respect to both the vertical and horizontal planes. It will be understood that the cross member 78 is fixedly secured to the sleeve 66 and that sleeve 66 is journalled on arm 42, so that although adjustable tilting of the rotary rake wheel can be effected, free rotation of the wheel upon the axis of the stem 68 is in no way interfered with.

From the foregoing it will be apparent that a variety of adjustments are possible with this rotary rake attachment. By proper adjustment of the plates 32 and 46 the arm 42 may be given any desired horizontal displacement from the longitudinal axis of the foot member 28 and thereby position the rake in any desired distance to one side of the furrow. The adjustment of the engagement of the bolt 72 with the straps 80 will in turn effect any desired tilting of the axis of rotation of the rotary wheel with respect to the vertical and horizontal planes. Thus the operation of the rake may be regulated to vary the width of soil which is raked by the wheel and also to effect dumping of the stubble collected thereby into the furrow 16 which has just been plowed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stubble rake comprising an upper support section and a lower section provided with an elongated guide member adapted to be received in and slide in a plow furrow behind a plow, draft means connected to one of said sections for attaching the stubble rake to a propelling means for movement along a furrow, connecting means connected to and securing said sections together, a rotary toothed rake wheel, mounting means supporting said rake wheel upon said support section in dependent relation thereto for rotation about an axis which is inclined to the vertical and to the horizontal planes with the rearward teeth of the rake engaging the ground for rotation thereby upon the unplowed ground to one side of a furrow and with said rake wheel being so tilted as to sweep stubble from the unplowed terrain adjacent the furrow into the latter.

2. The combination of claim 1 wherein said connecting means comprises complementary plates carried fixedly by adjacent vertically alined extremities of said sections, a pivot connecting said plates for movement about a vertical axis, fasteners securing said plates in adjusted, horizontally pivoted position.

3. The combination of claim 1 including brace members rigidly secured each to one of said sections and to said connecting means.

4. The combination of claim 1 wherein said lower section elongated member includes a straight horizontal foot member consisting of a rod slidable in the bottom of a furrow with a vertical upstanding neck at its forward end to which said connecting means is secured.

5. The combination of claim 1 wherein said support section includes a straight, substantially horizontal rod-like arm, with a vertical depending neck at its forward end to which said connecting means is secured.

6. The combination of claim 1 wherein said lower section has a laterally projecting lug, said draft means being connected to said lug at its outer end whereby to impart a turning force to said lower section and maintain it at one side of the furrow.

7. The combination of claim 1 wherein said mounting means comprising a support member journaled on said upper section for pivoting about a horizontal axis, said support member having a perpendicular stem depending therefrom, said rake wheel being journaled on said stem for rotation about the longitudinal axis of the latter.

8. The combination of claim 7 including a support post on said upper section, a member secured to said post and having ends extending outwardly and downwardly from opposite sides of the post and means adjustably securing said ends to said support member whereby to adjustably pivot the latter about said horizontal axis.

9. The combination of claim 8 wherein said last mentioned means are connected to opposite ends of a cross member which in turn is fixedly secured to said support member.

References Cited in the file of this patent

UNITED STATES PATENTS

| 1,797,028 | Snyder | Mar. 17, 1931 |
| 2,710,519 | Winter | June 14, 1955 |
| 2,917,118 | Christensen et al. | Dec. 15, 1959 |

FOREIGN PATENTS

| 211,606 | Australia | Nov. 28, 1957 |